United States Patent [19]

Musé

[11] 4,095,169

[45] June 13, 1978

[54] METHOD FOR LOCATING DISCONTINUITIES IN THE ELECTRICAL CONDUCTIVITY OF THE SUB-SOIL USING A PLURALITY OF MAGNETIC DETECTORS IN A PREDETERMINED SPATIAL ARRANGEMENT

[75] Inventor: Louis Marcel Musé, Rocquencourt, France

[73] Assignee: General Electro-Magnetic Prospecting, Inc., Santa Rosa, Calif.

[21] Appl. No.: 665,212

[22] Filed: Mar. 9, 1976

[30] Foreign Application Priority Data

Apr. 7, 1975 France .................................. 75 10761

[51] Int. Cl.² ........................... G01V 3/08; G01V 3/00
[52] U.S. Cl. ...................................................... 324/8
[58] Field of Search ........................... 324/3, 4, 8, 43 R

[56] References Cited

U.S. PATENT DOCUMENTS

| | | | |
|---|---|---|---|
| 2,374,166 | 4/1945 | Beach et al. ........................ | 324/8 X |
| 2,427,666 | 9/1947 | Felch et al. .......................... | 324/8 X |
| 2,560,834 | 7/1951 | Whitehead et al. ................... | 324/3 |
| 2,635,134 | 4/1953 | Jenny ....................................... | 324/8 |
| 2,996,657 | 8/1961 | Varian ................................. | 324/8 X |
| 3,085,197 | 4/1963 | Hings .................................... | 324/8 |
| 3,149,278 | 9/1964 | Cartier et al. ....................... | 324/8 X |
| 3,422,345 | 1/1969 | Musé .................................... | 324/8 X |
| 3,568,048 | 3/1971 | Robinson ............................... | 324/8 |
| 3,905,121 | 9/1975 | Takeda et al. ...................... | 324/43 R |

*Primary Examiner*—Gerard R. Strecker
*Attorney, Agent, or Firm*—Townsend and Townsend

[57] ABSTRACT

A method and apparatus for investigating the electromagnetic characteristics of the sub-soil. At least four and normally five directional magnetic field detectors placed on the ground. A first set of two detectors is spaced apart and oriented in the same general direction, a second set of two detectors is also spaced apart and oriented in a second direction transverse to the first direction, and the fifth detector is positioned on the ground transversely to the first four detectors. The output signals generated by the detectors, which are characteristic of portions of the sub-soil underlying the detectors, are simultaneously recorded for subsequent analysis to identify sub-soil characteristics, discontinuities, mineral deposits and the like.

15 Claims, 6 Drawing Figures

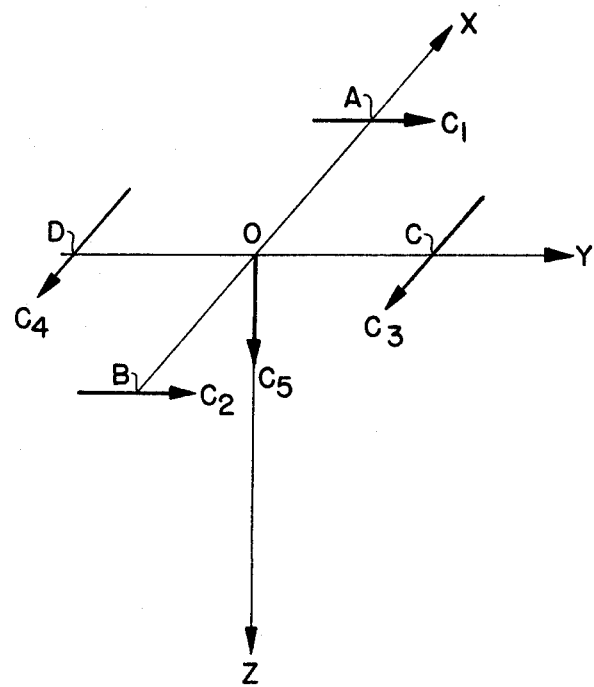
FIG._1.
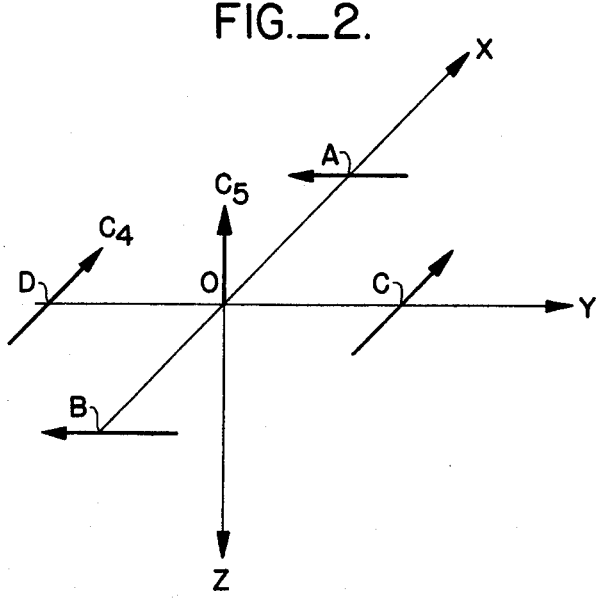
FIG._2.

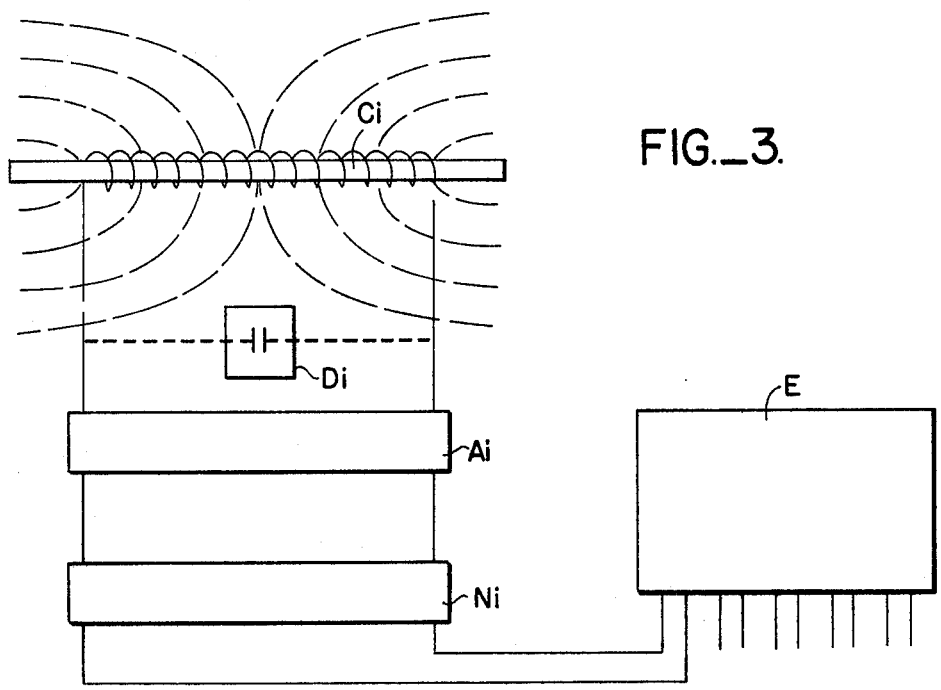
FIG._3.
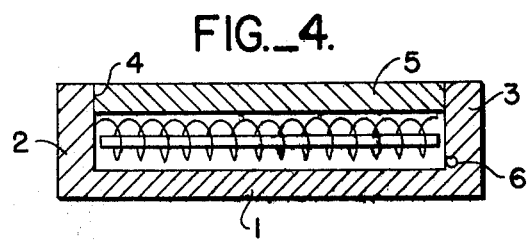
FIG._4.
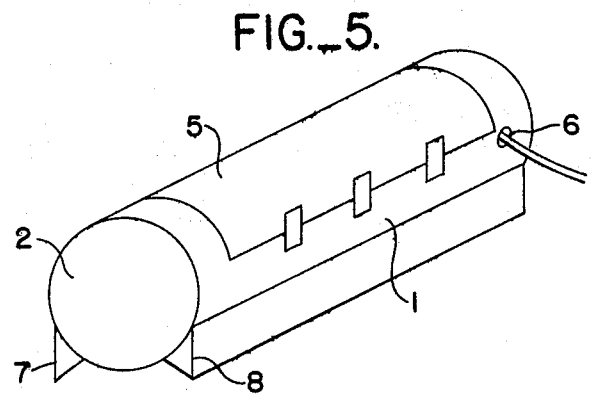
FIG._5.

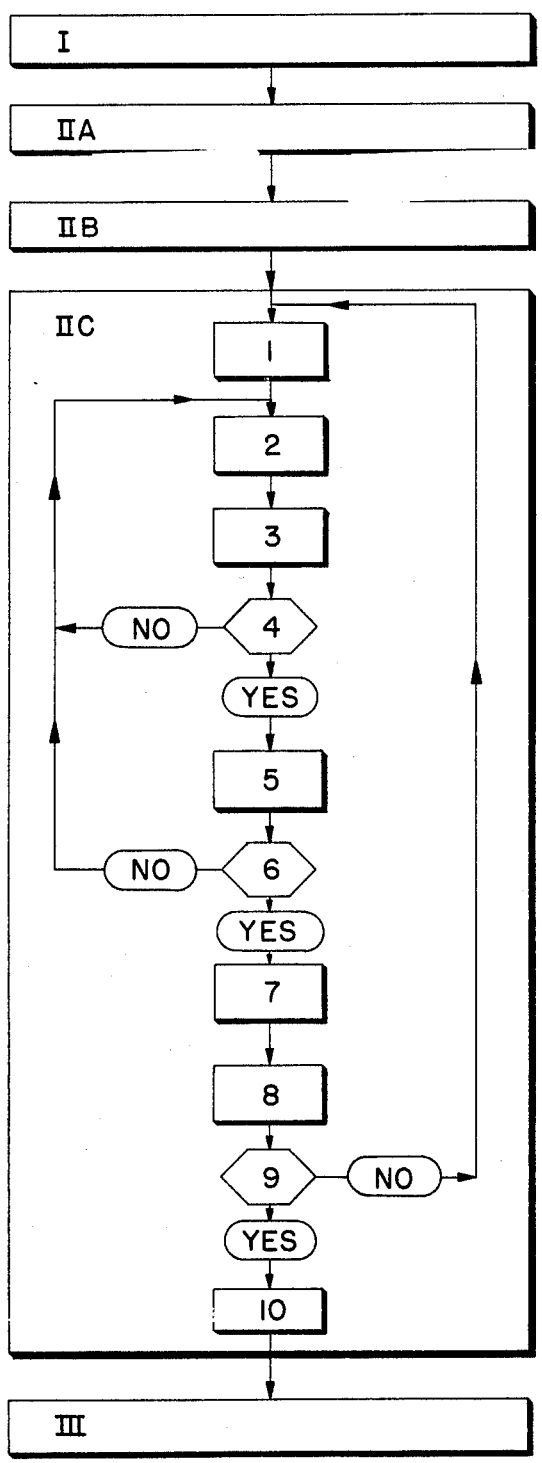
FIG._6.

METHOD FOR LOCATING DISCONTINUITIES IN THE ELECTRICAL CONDUCTIVITY OF THE SUB-SOIL USING A PLURALITY OF MAGNETIC DETECTORS IN A PREDETERMINED SPATIAL ARRANGEMENT

BACKGROUND OF THE INVENTION

The present invention relates to a method and apparatus for studying the sub-soil and its electro-magnetic properties. It is especially adapted to be used in mining, oil, geothermal and hydrology prospecting, and whenever there is need accurately to locate an anomaly (i.e. discontinuity) in the electric conductivity of the sub-soil.

The magnetic and electric fields in the ground undergo continuously changing fluctuations which have their origin in ionospheric disturbances which themselves result from solar activity. Since their origin is very remote, if the sub-soil were homogeneous, such fluctuations should be quite uniform over distances of the order of tens of kilometers and more. On the basis of these observations, a geophysical method was developed several decades ago by Conrad Schlumberger and his co-workers. According to that method, known as the telluric method, simultaneous recordings of natural underground electric currents, called telluric currents, at two stations separated by a given distance are compared. When the recordings cannot be superimposed one can conclude that the composition of the sub-soil between the two stations differs. With a few calculations and corrections, an analysis of the variations of the recordings from the various stations will give some indication regarding the structure of the sub-soil.

This method, however, produces results which are difficult to interpret and are much more qualitative than quantitative in character. Moreover, the necessity for at least two simultaneous recordings at different stations is cumbersome since in order to obtain an acceptable accuracy, it is necessary to deploy at each station an insulated wire several hundreds of meters in length. For these reasons the above discussed method was superseded by the so-called magneto-telluric method developed by Louis Cagniard around 1950 (see French Pat. No. 1,025,683). In that method an electric field at a point of the ground surface is compared with the magnetic field with which it is connected by the general equations of Maxwell which relate the character of an electric field with that of an associated magnetic field.

The need to make two recordings of the electric field at two different points is thus avoided by the magneto-telluric method. Moreover, the ratio between the magnetic and the electric field amplitudes can easily be used to supply indications regarding the structure of the sub-soil. In this regard, use is made of the so-called "skin effect" phenomenon according to which as the frequency of the naturally induced electro-magnetic wave decreases the depth of penetration of the wave increases.

Until recently the electro-telluric or magneto-telluric recordings were interpreted by using Fourier transformations, that is to say by considering the variations of the magnetic and electric fields as periodic phenomena. In the course of the past few years, there has come about an improvement of the magneto-telluric method in which the field variations are considered as exponential phenomena rather than as periodic phenomena (see Geothermics, Vol. 2, No. 2, June 1973). Given a modification of the measuring apparatus, it has thus been possible to obtain an increased accuracy because there have been taken into account in a practical manner the variations in the vertical component of the magnetic field.

Thus, one can see that the various prospection methods just described have been successively improved. They are now well suited for use in cases in which the structures of the sub-soil and in particular of mineral deposits are horizontal or slanted, with regular or variable slopes (cylindrical or pseudo-cylindrical structures), provided that the conductivity contrasts or differences are sufficiently pronounced.

The above-discussed methods, however, are not well suited for sub-soil structures or deposits having a vertical or sub-vertical slope as sometimes found in the course of mining or geothermal explorations in which the deposits are generally vertically oriented and have limited horizontal surfaces. This limitation results from the poor localization characteristics of the existing methods involving long lengths of electrical lines used. In effect, the measurement accuracy of the electric field is a function of the length of the electric wire extended over the ground for registering the voltage differential potential between its ends.

It would, of course, be possible to use very short electrical lines and to provide for a suitable amplification. However, parasitic (stray current) phenomena such as spontaneous polarizations, variations in the nature of the ground in the immediate neighborhood of the electrodes, etc. tend to frustrate such a method. In practice, the electrical lines usually have a length in the order of from one hundred to several hundred meters. Moreover, it is difficult to locate in the sub-soil anomalies or deposits having dimensions in the order of a few meters, or tens of meters with the necessary accuracy for detecting faults which might contain minerals, fractures or breaking zones in a calcareous reservoir, the edge of a small fossil reef more or less invaded with hot or salted water, etc.

It should also be noted that high population densities can also adversely affect the electric lines due to industrial or natural stray currents emanating from sources in the vicinity of the lines.

A primary object of the present invention is to improve prospecting methods to eliminate the above-mentioned drawbacks and limitations, especially for the making of maps, profiles or apparent conductivity electrical tables.

In order to better indicate the scope of the invention, it is suitable to recall that, in the case of terrains with a tabular distribution, it is very well-known both theoretically and experimentally that the respective vertical components of the electric and magnetic fields are null.

This is no longer the case when in the midst of the sub-soil there occurs a sudden discontinuity of the type already indicated above, such as a fault or interruption of any type, a change of features, the sudden appearance of a reservoir presenting geothermal interest, etc.

It can even be said that the presence of such a discontinuity in a given sub-soil can be detected through the existence of a natural vertical electric component and a natural vertical magnetic component the variations of which are located in a given part of the electro-magnetic spectrum as a result of the skin effect. These variations will depend on the arrangement, the depth and the resistivity distribution which characterize said discontinuity, as well as on the surrounding milieu.

For the purpose of increasing the accuracy of locating mineral deposits or other sub-soil discontinuities on a commercial scale the present invention makes simultaneous measurements of the variations in the vertical magnetic component at a given point and as a function of time. It also measures the variations of a quantity "U" directly related both to the variations of the natural vertical electric component as a function of time, and to the depth-resistivity distribution in the underlying ground.

A suitable analysis of the signals thus recorded makes it possible to obtain physical non-variables which are representative of the subjacent ground at the point of measurement.

For the sake of clarity, it is appropriate to recall one of the fundamental relationships in electro-magnetism. There are first arbitrarily defined at the surface of the ground two axes of coordinates Ox and Oy, which cross at point O and which define the horizontal surface at the point under consideration. Axis Oz defines the descending vertical. $H_x$ is the natural magnetic component along axis $O_x$; $H_y$ is the natural magnetic component along axis $O_y$. It is known that:

$$4\pi U = \delta H_y/\delta x - \delta H_x/\delta y, \text{ with } U = \sigma E_z$$

$E_z$ represents the natural vertical electric component and $\sigma$ represents the electric conductivity of the medium at the surface at which point O is placed.

Moreover, the natural vertical electric component $E_z$ is related for a given component of the electro-magnetic spectrum, to the various components $H_x$, $H_y$, $H_z$ through the expression:

$$E_z = \lambda H_x + \mu H_y + \nu H_z$$

in which $\lambda$, $\mu$ and $\nu$ are constants.

One then proceeds at a given point and as a function of time, to simultaneously measure component $H_z$ and the two components $H_x$ and $H_y$, as well as to measure the variations of $H_x$ when moving a small distance L along axis $O_y$ and the variations of $H_y$ when moving the same distance along axis $O_x$. It is then possible, through a suitable analysis of the signals thus recorded, to obtain physical non-variables which are useful to the prospector, as will be explained below.

A measuring device constructed according to the present invention essentially includes a set of five magnetic sensors or detectors, respectively characterized by response curves which are identical among themselves or which present known relationships, each one of these sensors being "directional", that is to say each one presents a favored direction in which it is most sensitive to the variations of the magnetic field as a function of time.

The five sensors are placed in the following manner: three sensors $C_x$, $C_y$, $C_z$ are oriented in three different respective directions X, Y and Z, direction Z not being parallel with the surface of the ground; a fourth sensor is placed outside the plane defined by sensor $C_x$ and directions X and Z, its orientation being different from those contained in plane YZ; a fifth sensor is placed outside the plane defined by sensor $C_Y$ and directions Y and Z, its orientation being different from those contained in plane XZ.

According to a preferred arrangement, direction Z is approximately vertical; directions X and Y are approximately horizontal and perpendicular to each other; and the orientation of the fourth and fifth sensors are parallel to X and to Y, respectively. This ensures the most precise data and the simplest calculations.

The invention further includes means for simultaneously recording, as a function of time, the variations of the components of the magnetic field which have been detected by the five sensors.

The present invention will now be described in greater detail, with reference to the accompanying drawings in which:

FIG. 1 diagrammatically illustrates the placement of the sensors or detectors on the ground;

FIG. 2 is a diagram similar to that of FIG. 1 but illustrates an alternative placement of the sensors:

FIG. 3 is a schematic diagram of a sensor and of the recording system connected thereto;

FIG. 4 illustrates the means by which it is possible to set a sensor at zero;

FIG. 5 is a perspective view of the device in FIG. 4; and

FIG. 6 is a block diagram, or flow chart illustrating one method of analysis of the recorded date from the sensors.

FIG. 1 schematically illustrates the measuring device arrangement in perspective view, with the sensors spaced over the ground around a central reference point O and with respect to a system of coordinates as defined above.

Each one of the magnetic sensors has been represented by an arrow followed by the letter C to which there has been added subscript number ranging from 1 to 5.

The use of the "arrow" symbol makes it possible to represent not only the axis of the magnetic component, the variations of which the respective sensors detect as a function of time, but also the direction along which the sensor is placed on the axis. The direction determines the polarity of the electric voltage output from the sensor and caused by said variations. It will be noted below that the direction of a sensor can always be reversed by simple electric switching or by calculation.

Two sensors $C_1$ and $C_2$ are respectively placed at points A and B, oriented in the same direction and both of them are parallel with axis $O_Y$. Two sensors $C_3$ and $C_4$ are respectively placed at points C and D, the positions and the directions of $C_3$ and $C_4$ being those which would be obtained by causing $C_1$ and $C_2$ to rotate ninety degrees along a circumferential arc with the center at O and radius L, so that point A would come to the location of point C, and point B to the location of point D.

Thus, AB = CD = L

In the arrangement of FIG. 1, sensor $C_5$ is placed as shown in FIG. 1 following the descending vertical $O_z$.

FIG. 2 illustrates the set of five sensors $C_1 - C_5$ placed along the same axes and at the same points, as in FIG. 1 but each sensor being oriented in the opposite direction.

As illustrated in FIG. 3, each sensor $C_i$ is respectively connected in a suitable direction to an amplification chain $A_i$ chosen according to the impedance and the response curve of the $C_i$. It may also be connected to external elements $D_i$ such as condensers, the usefulness of which will appear later.

Each amplification chain is connected to a device $N_i$ which makes it possible to give a numerical value to the voltages obtained after amplification, said device being itself connected to a common recording device E.

The five voltages respectively output from the five sensors $C_1$, $C_2$, $C_3$, $C_4$, and $C_5$, are simultaneously recorded for a length of time determined as useful for the case under consideration.

The output signals from the sensors of the present invention may be analyzed according to various mathematical techniques. The analysis may be of the conventional type utilizing Fourier transformation for the calculation of periodic solutions for the general equations of electro-magnetism. However, because of the well-known difficulties which appear when seeking to obtain, with an analysis of that type, the phase shift of an electro-magnetic component, it is preferred to work out solutions of the real increasing exponential type satisfying Maxwell's equations, and to calculate the corresponding amplitudes following the principles alluded to the above and described in *Geothermics*, Vol. 2, No. 2 (June 1973) at P.41–50. This exponential method of data analysis presents the advantage of completely eliminating the problem of analyzing phase shifts which exist among the various electro-magnetic components, the notion of a period T giving place to that of the time constant $\tau$. A typical processing algorithm for analyzing the data obtained according to the present invention using an exponential solution will be generally described below.

Let $X_1$, $X_2$, $Y_1$, $Y_2$ and Z designate a group of five amplitude values which respectively define five solutions calculated according to the present analysis process, those solutions all referring to the same instant, $t$, and for the same time constant $\tau$, wherein:

$X_1$ corresponds to the magnetic component detected by $C_3$.

$X_2$ corresponds to the magnetic component detected by $C_4$.

$Y_1$ corresponds to the magnetic component detected by $C_1$.

$Y_2$ corresponds to the magnetic component detected by $C_2$.

Z corresponds to the magnetic component detected by $C_5$.

Taking into account the mean behavior of the electromagnetic characteristics during a time interval long enough with respect to the value of the time constant $\tau$ under consideration, if enough groups of values $X_1$, $X_2$, $Y_1$, $Y_2$, Z have been calculated it is possible to proceed to statistical computations with expressions of the type:

$$C = K_1 \cdot \frac{\tau}{L} \frac{|(Y_1 - Y_2) + (X_1 - X_2)|}{\sqrt{(Y_1 + Y_2)^2 + (X_1 + X_2)^2 + 4Z^2}}$$

Where C has the dimensions of a conductance and $K_1$ is a constant which depends on the units chosen.

It has been found that the accuracy of the results obtained according to the present invention is not significantly degraded if the Z term in the above expression is deleted. In such case, of course, only four detectors are required, the detector for the vertical component of the magnetic field being omitted.

It will be noted that the "conductance" C is not representative of the real conductance of the sub-soil. Indeed, in the absence of any anomaly we have $X_1 = X_2$ and $Y_1 = Y_2$ so that C is zero The importance of knowing C during prospecting is that it is characteristic of the depth-resistivity distribution in the sub-soil vertically below the measuring device.

It is, of course, possible also to calculate expressions other than those of the above-expressed "conductance", but which are none-the-less representative of the sub-soil under consideration.

For example, the result may be expressed in the form of penetration depth P for a given value of $\tau$ with $$P = K_2 \cdot L \frac{\sqrt{(Y_1 + Y_2)^2 + (X_1 + X_2)^2 + 4Z^2}}{|(Y_1 Y_2) + (X_1 X_2)|}$$

where $K_2$ is another constant which also depends on the units chosen.

Finally, using values of C or P (or similar variables) computed above above, it is possible to trace conductance maps or profiles which show anomalies existing in the sub-soil.

As an example, FIG. 6 illustrates a simplified flow diagram of a typical process followed for the establishment of a "probing".

In the field, there takes place Stage I which is the recording of the five tracings $H_i$ obtained from the transformation of the magnetic variations detected by the sensors into an electric voltage output which is recorded by device E (see FIG. 3).

State II is the computer processing of the recorded data and includes: the "demultiplexing" of the tracings; IIA — preparation of the tracings for processing, filtering, and correction of the derivatives. IIB — the data analysis itself, designated IIC includes the following steps:

1. Choice of a time constant $\tau$ from a list established in advance.

2. Choice of an initial time $t_o$ on the "H" tracings.

3. Construction of five new tracings $H_i$ by linear combinations of sections of tracings which correspond to a time $\Delta T$ chosen in advance (time $\Delta T$ is chosen as a function of the constant $\tau$).

4. Comparison of tracings $H'_i$ with a theoretical model to determine whether the expression $$e^{\frac{t}{\tau}} \int_0^{\Delta T} e^{-\frac{t}{\tau}} H_i \, dt$$

is an acceptable solution of Maxwell's equations
If not, return to step 2.
If so, 5. Computation of the five values $$I = \int_0^{\Delta T} e^{-\frac{t}{\tau}} H_i(t) \, dt$$

($I = X_1, X_2, Y_1, Y_2$ or Z)

6. Determination of whether a sufficient number of groups of values I have been calculated to permit a valid statistical computation.
If not, return to step 2.
If so:

7. Statistical treatment of groups I

8. Computation of the value of conductance $C(\tau)$ corresponding to the time constant chosen.

9. Determination of whether the computation has been made for all of the values held for the time constant $\tau$.

If not, return to 1.

If so,

10. Result is a Table of Results, and construction of a curve of "apparent" conductances as a function of the time constant $\tau$.

Finally, Stage III includes going back over the computations and the geological interpretation of the results.

The construction of the individual magnetic sensors will now be described.

It is well-known that it is possible to obtain, by means of a suitable sensor or detector, a faithful or very nearly faithful recording of the magnetic variations in a given field of the natural spectrum; for example, precision magnetometers (magnetism measuring devices) make it possible to accurately follow the variations of the magnetic field.

As a result of their mechanical inertia, magnetometers with a movable magnet cannot follow too rapid variations in the magnetic field, and their use is essentially foreclosed when the spectrum mainly presents variations the duration of which is less than a few seconds.

A coil, with or without a core, can also give a faithful recording, if not of the magnetic field, at least of its derivative with respect to time, providing it has a rather small number of turns. It must further be noted that it makes no difference whether the field or its derivative is recorded since, in the case of harmonic analysis, the amplitude and phase relatins of a sinusoidally varying quantity to its derivative are known beforehand. The same is true with respect to the amplitude ratios with an analysis based on the computation of real increasing exponential solutions, as discussed below.

In choosing a magnetic detector, for the case under consideration, it is essential to take into account the fact that the order of magnitude of the amplitude variations of the magnetic field becomes very small when dealing with a short period equal to a second or less. In that part of the spectrum which is important for the prospector, prior art detectors have a sensivity level which is much too low. Inductive detectors then become necessary and they must be given sufficient sensitivity through the use of a very large number of turns of a relatively thin wire, wound around a core having a high magnetic permeability. With a coil of this type, self induction is enormous and the capacities of the coils themselves are far from negligible, with resonance effects in the coil assuming great importance. It may even be necessary to add external elements, for example condensers, to create resonance effects which are favorable to an increase in sensitivity in one part or another of the spectrum.

From the above it can be seen that practical requirements of obtaining an acceptable sensivity and avoiding distortions in the recording, are contradictory. As the need for sensitivity comes ahead of any other consideration, it is necessary to be content with recordings which are very unreliable, that is to say, which distort greatly and in a very complicated manner both amplitude and phase.

In theory, it is always possible to effect a prior calibration of the detectors as a function of the period, both with respect to amplitude and to phase; but it is clear that when distortion of the input signal is significant, this will lead to unacceptable inaccuracy of the final result.

In reality, with respect to prospecting with the above-described defined for of anomalies in the electric conductivity of the sub-soil, as already mentioned, it appears that the distortion exerted on the excitation signals by the induction type magnetic detector presents no drawback when the five detectors used have amplitude and phase response curves which are identical to one another.

Indeed, the C and P expressions developed above bring into play only amplitude ratios, and they eliminate all of the terms connected with the transfer function particular to each sensor, and which includes the resistance, self-induction and capacitance characteristics of the sensor, as well as the period T or the time constant $\tau$ under consideration.

In other words, despite the distortions they impose on the excitation signals, induction type sensors can be used in prospecting according to the present invention. This renders possible an especially simple and practical form of execution on the terrain, according to the diagram in FIG. 1. Indeed, induction-type sensors, when mechanically and thermally sufficiently protected, have the advantage of not requiring any preliminary adjusting in order to function properly because they only include inert elements.

To detect the variations in the earth's magnetic field in accordance with the present invention, magnetic sensors of the following construction have produced good results:

The detector core is a highly permeable metal made of molybdenum numetal, is cylindrical in shape having a length of 50 cm and a diameter 1 cm.

On the core there are wound 1,750,000 turns of insulated copper wire with a nominal diameter of 0.004 mm
and a resistance equal to $1.77 \cdot 10^6$ ohms
total weight of the sensor is approximately 3.5 kilograms.

Such a unit, which makes it possible to record a slowly fluctuating spectrum, is placed into an insulating and mechanically protective enclosure of plastic material, bringing the total weight to approximately 15 kilograms.

There remains a problem regarding the operation of such sensors; that is the necessity for the user to obtain the zero of its measuring chain when the induction sensor is connected. Indeed, the recording chain, the zero of which is obtained by short-circulating amplifier A, (FIG. 3), will experience a zero shift when the detector is connected due to the effect of the high impedance, which is a function of A, R and C. But it is difficult to clearly estimate the zero shift since, when the detector is connected, the recording chain transmits a signal resulting from the permanent variations of the earth magnetic field.

To offset this provisions are made to protect the detector by completely surrounding it with a cylinder of metal having a high magnetic permeability with or without any connection to the ground, for the period of time necessary to find the zero setting.

A device of this type is illustrated in FIGS. 4 and 5. It includes a hollow cylinder 1 of metal with high magnetic permeability, such as for example, soft iron, for example. The ends 2, 3 of the cylinder are solid and made of the same metal.

An opening 4, fitted with a cover 5 of the same metal, makes it possible to introduce the detector C inside cylinder 1. The conductors which connect the detector to the recording chain run through an opening 6 oriented perpendicularly to the direction of the detector, and located at the end of the device. External legs 7, 8 assure a sturdy support for the cylinder.

Once it has been decided to proceed with the recording, the detector is taken out of its magnetically protective container and is placed at the location and in the direction chosen.

Generally speaking, the prospecting process which has just been described offers, as compared with the magneto-telluric method, the advantage of a more rapid execution, especially in areas with an uneven surface. Thus, there exists the possibility of taking a few measurements without having to set into place, as necessary with the magneto-telluric method, electric lines of considerable length. Moreover, the fact of recording only magnetic variations eliminates all of the drawbacks resulting from the necessity of recording electric variations, such as using electrodes in very dry or very hard or frozen terrains, etc.

As a result, the prospection process according to the present invention presents the advantage of requiring fewer instruments for its execution, and its cost of exploitation is lower.

Moreover, the present invention makes possible a more accurate locating of the anomalies spoken of at the beginning of the present text, and it represents a great help in determining the limits of a reef, the presence of a fault serving as a geothermal reservoir, or any other anomaly or localized variation in the sub-soil.

I claim:

1. A method for obtaining an indication of the electro-magnetic characteristics of the sub-soil underlying a ground surface comprising the steps of:
   a. placing on the ground in a substantially horizontal plane at least four directional magnetic field detectors in two sets wherein each set comprises a spaced pair of detectors oriented in the same direction with the detectors of each set oriented at right angles to the detectors of the other set;
   b. simultaneously monitoring the output signal from each of said detectors over a period of time, each of said output signals being made up of a plurality of spectral components;
   c. electronically processing said output signals by characterizing each of said spectral components as being of the form $H = H_0 e^{t/\tau}$ where $t$ is time and $\tau$ is a time-constant to derive for each of said spectral components in each of said output signals a magnetic field amplitude value $H_0$;
   d. combining amplitude values corresponding to the same spectral component from each of said output signals to obtain a non-variable physical parameter associated with said spectral component which is related to the electrical conductivity of the sub-soil beneath the detectors and is independent of any phase shift existing between the output signals from the pair of detectors in each of said sets.

2. The method of claim 1 comprising the further steps of deriving a plurality of additional non-variable physical parameters each being associated with a different one of said spectral components; and evaluating the group of parameters so obtained to determine the geophysical structure of the sub-soil beneath said detectors.

3. The method of claim 1 wherein said parameter reflects the difference between the amplitude values corresponding to the two detectors in each set.

4. The method of claim 1 wherein said detectors are deployed in a rectangular arrangement with the detectors of each pair lying along opposite sides of a rectangle.

5. The method of claim 4 wherein the detectors are arranged in a square pattern with the detectors of each pair lying along opposite sides of a square and the distance between the detectors of each pair is the same.

6. The process of claim 1 comprising the further steps of placing on the ground a fifth detector oriented in a substantially vertical direction; monitoring the output signal therefrom and utilizing said output signal in the derivation of said physical parameter.

7. A process according to claim 1 wherein the detectors have substantially identical response curves.

8. A process according to claim 1 wherein the detectors are induction detectors having a very large number of thin wire turns.

9. A process according to claim 8 comprising the further step of utilizing additional elements such as condensers to create resonance effects which are favorable to an increase in sensitivity in one rea of the spectrum.

10. A process according to claim 9 including the step of placing a detector into a closed container of metal having a high magnetic permeability to enable the zero calibration of instruments connected with the detector.

11. A method for obtaining an indication of electromagnetic characteristics of a sub-soil underlying a ground surface comprising the steps of:
   a. defining with respect to a reference point on the ground surface three mutually perpendicular X, Y and Z directions, directions X and Y being in a generally horizontal plane and direction Z being generally transverse to the ground surface;
   b. providing at least four directional magnetic field detectors;
   c. positioning a first and a second detector relative to the ground surface area and orienting said first and second detectors in X and Y directions, respectively;
   d. positioning a third and a fourth detector relative to the ground surface area in spaced-apart and substantially parallel relationship with respect to the first and second detectors, respectively, and orienting the third and fourth detectors in substantially the same direction as the first and second detectors, respectively;
   e. generating with each of the detectors output signals responsive to a magnetic field of the sub-soil underlying the detector, each of said output signals further comprising a plurality of spectral components;
   f. electronically processing each of said output signals by characterizing each of said spectral components as being of real increasing exponential form to derive for each of said spectral components of each of said output signals an amplitude value;
   g. combining amplitude values associated with corresponding spectral components from each of said output signals to produce a non-variable physical parameter which is indicative of the electrical conductivity of the sub-soil beneath said detectors.

12. A method according to claim 11 including the step of positioning at least a fifth detector relative to the ground surface area and orienting the axis of the fifth detector substantially parallel to direction Z.

13. A method according to claim 12 wherein the step of positioning the fifth connector comprises the step of positioning the fifth detector between the first, second, third and fourth detectors.

14. A method according to claim 13 wherein the step of positioning the fifth detector comprises the step of substantially centering the fifth detector with respect to the first through the fourth detectors.

15. A method according to claim 11 wherein the step of positioning the detectors includes the step of positioning the detectors substantially equi-distantly from the reference point.

* * * * *